(12) United States Patent
Heeter

(10) Patent No.: US 12,209,506 B2
(45) Date of Patent: Jan. 28, 2025

(54) COMPOSITE FAN CASE CONTAINMENT HOOK AND IMPROVED FORWARD DEBRIS CAPTURE

(71) Applicant: Rolls-Royce North American Technologies Inc., Indianapolis, IN (US)

(72) Inventor: Robert W. Heeter, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 25 days.

(21) Appl. No.: 17/591,210

(22) Filed: Feb. 2, 2022

(65) Prior Publication Data

US 2023/0243275 A1    Aug. 3, 2023

(51) Int. Cl.
| F01D 21/04 | (2006.01) |
| F01D 11/12 | (2006.01) |
| F01D 25/24 | (2006.01) |
| F02K 3/06  | (2006.01) |

(52) U.S. Cl.
CPC .......... F01D 21/045 (2013.01); F01D 11/125 (2013.01); F01D 25/24 (2013.01); F02K 3/06 (2013.01); *F05D 2220/36* (2013.01); *F05D 2250/283* (2013.01); *F05D 2260/96* (2013.01); *F05D 2300/603* (2013.01)

(58) Field of Classification Search
CPC ...... F01D 21/045; F01D 11/125; F01D 25/24; F01D 11/122; F01D 11/127; F05D 2220/36; F05D 2250/283; F05D 2260/96; F05D 2300/603; F05D 2240/14; F02K 3/06; Y02T 50/60; F04D 29/526

USPC .................................................... 415/9
See application file for complete search history.

(56) References Cited

U.S. PATENT DOCUMENTS

| 5,413,456 | A  * | 5/1995  | Kulak ............. F01D 21/045 |
|           |      |         |                       415/200 |
| 6,652,222 | B1   | 11/2003 | Wojtyczka et al. |
| 6,814,541 | B2   | 11/2004 | Evans et al. |
| 7,246,990 | B2   | 7/2007  | Xie et al. |
| 8,016,543 | B2   | 9/2011  | Braley et al. |

(Continued)

FOREIGN PATENT DOCUMENTS

| EP | 3640439 A1 | 4/2020 |
| EP | 3382158 B1 | 9/2020 |

*Primary Examiner* — Woody A Lee, Jr.
*Assistant Examiner* — Eric A Lange
(74) *Attorney, Agent, or Firm* — Barnes & Thornburg LLP

(57) ABSTRACT

A fan case assembly extend along and around a center axis. The fan case assembly may comprise a barrel extending along and around the center axis, the barrel configured to fasten to a flange of an engine case. The fan case assembly may comprise a fan track liner disposed radially inward of the barrel and a containment hook, wherein the containment hook is a discrete component separate from the barrel. The containment hook may include a front segment configured to fasten to the flange, and an axial segment disposed radially inward of the barrel. The axial segment may extend between the flange and the fan track liner and the front segment may extend radially outward from an end of the axial segment. The containment hook may also include a protruding segment extending radially inward from the axial segment.

20 Claims, 9 Drawing Sheets

(56) References Cited

U.S. PATENT DOCUMENTS

| | | |
|---|---|---|
| 8,021,102 B2 | 9/2011 | Xie et al. |
| 8,061,967 B2 * | 11/2011 | Marlin ............... F02K 3/06 |
| | | 415/9 |
| 8,322,971 B2 | 12/2012 | Coupe et al. |
| 8,757,958 B2 | 6/2014 | Lussier |
| 8,827,629 B2 | 9/2014 | Voleti et al. |
| 9,951,645 B2 | 4/2018 | Evans et al. |
| 10,174,633 B2 | 1/2019 | Hall et al. |
| 10,443,617 B2 | 10/2019 | Finnigan et al. |
| 10,641,287 B2 | 5/2020 | Kappes et al. |
| 10,655,500 B2 | 5/2020 | Heeter |
| 11,118,472 B2 | 9/2021 | Finlayson et al. |
| 11,118,511 B2 | 9/2021 | Finlayson et al. |
| 2013/0195635 A1 * | 8/2013 | Robertson, Jr. ....... F01D 21/045 |
| | | 415/197 |
| 2017/0122126 A1 * | 5/2017 | Hall ................. F01D 25/24 |
| 2020/0123976 A1 * | 4/2020 | Finlayson ............ F01D 21/045 |
| 2020/0200038 A1 | 6/2020 | Hall et al. |

\* cited by examiner

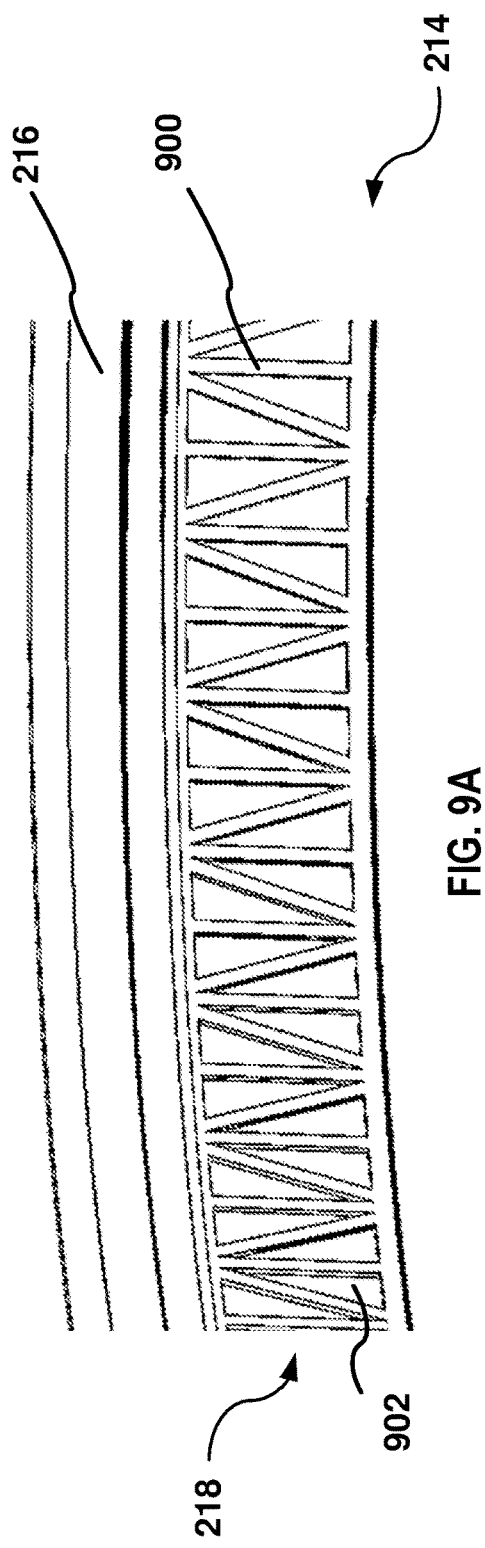
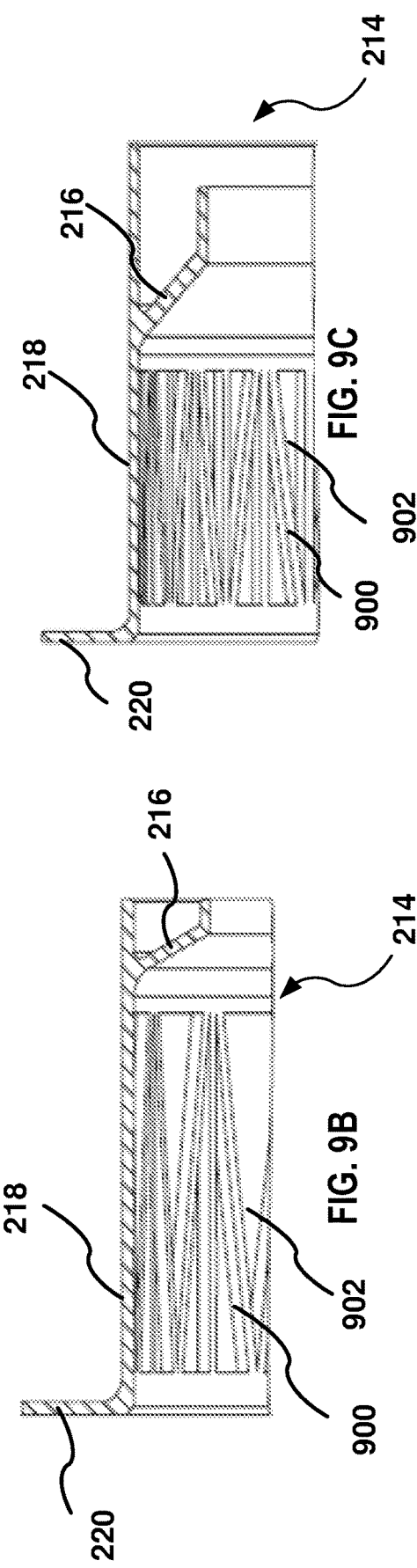
FIG. 9A
FIG. 9B
FIG. 9C

COMPOSITE FAN CASE CONTAINMENT HOOK AND IMPROVED FORWARD DEBRIS CAPTURE

TECHNICAL FIELD

This disclosure relates to fan cases and, in particular, to fan case containment systems.

BACKGROUND

Present fan case containment systems face challenging requirements and existing configurations may present certain drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIGS. 9A-C illustrate examples of a containment hook comprising frame segments and/or a frame structure.

DETAILED DESCRIPTION

Figure 1:
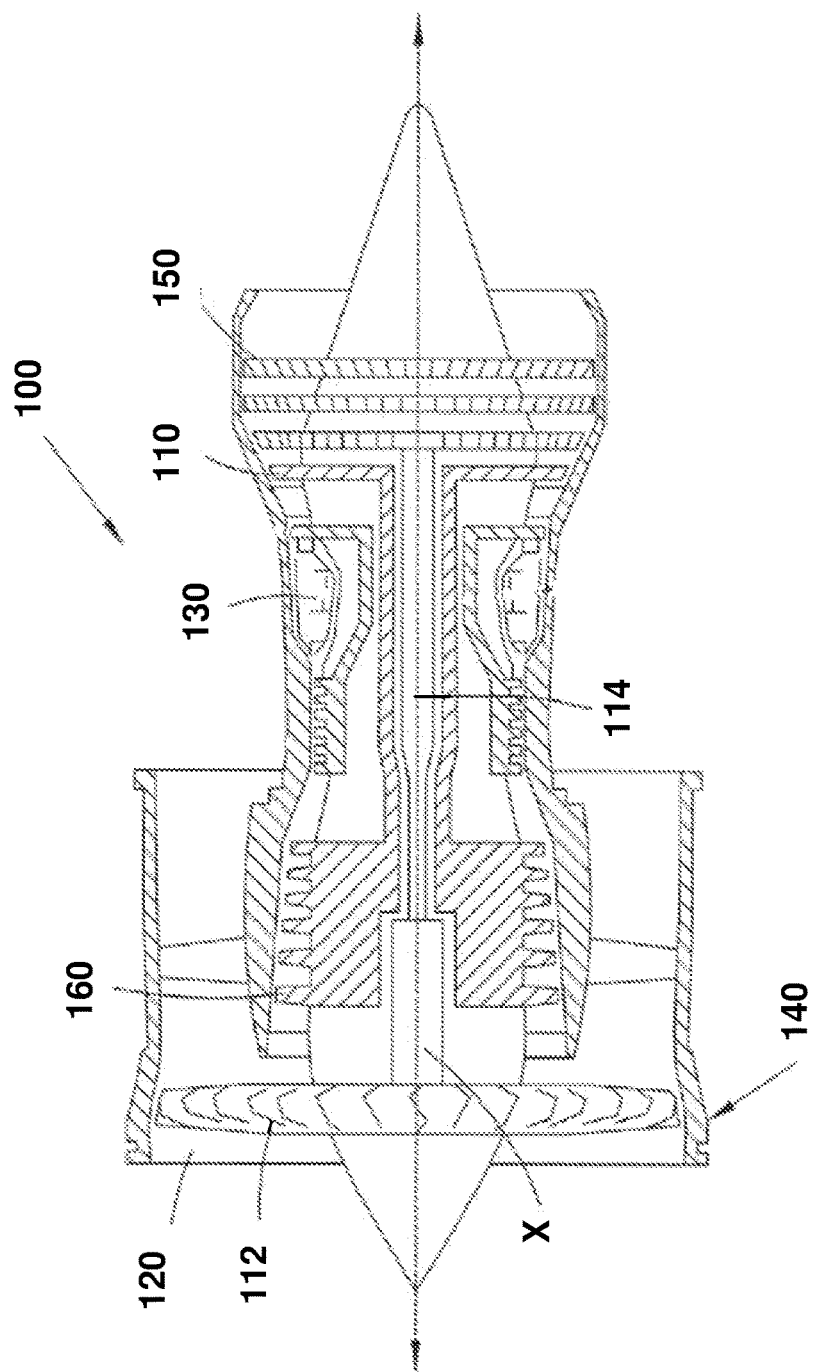
FIG. 1 illustrates a cross-sectional view of an example of a gas turbine engine.

A fan case assembly is provided that may comprise a center axis. The fan case assembly may extend along and around the center axis. The fan case assembly may further comprise a barrel extending along and around the center axis, where the barrel is configured to fasten to a flange of an engine case. The flange may be, for example, the A1 flange of the engine casing. The fan case assembly may comprise a fan track liner disposed radially inward of the barrel, where a forward edge of the fan track liner is disposed aft of the flange. The fan case assembly may comprise a containment hook, where the containment hook is a discrete component separate from the barrel. The containment hook may include a front segment configured to fasten to the flange, and an axial segment disposed radially inward of the barrel. The axial segment may extend between the flange and the fan track liner and the front segment may extend radially outward from an end of the axial segment. The containment hook may also include a protruding segment extending radially inward from the axial segment.

One interesting feature of the systems and methods described below may be that the geometry of the containment hook enables the containment hook to directly fasten to the forward flange even if the barrel or engine case is a composite material. Such a containment hook may enable a more robust containment system and stronger attachment of the containment hook than if the hook were bonded to a composite case, which may experience issues such as debonding or otherwise failing of the containment hook. The geometry of the containment hook and arrangement of fan case assembly components may also enable easier maintenance of a forward acoustic panel (FAP) in case the FAP becomes damaged and/or needs to be removed and replaced.

Alternatively, or in addition, an interesting feature of the systems and methods described below may be that a combination of a fan track liner with multiple honeycomb layers, portions, and/or sections of varying strengths may be to guide detached fan blades or projectiles towards the containment hook. For example, stronger layers, sections, and/or portions may push the projectiles towards the weaker layers, sections, and/or portions. Additionally, or alternatively, the shape and angle of the containment hook and honeycomb sections may also help guide projectiles towards the containment hook and towards a cavity formed between the containment hook and fan track liner.

Alternatively, or in addition, an interesting feature of the systems and methods described below may that skeletoning or weight reduction of the containment hook may help the containment hook collapse or tear away in a manner that helps retain any blades or projectiles. The axial portion of the hook may be wrinkled or slightly kinked somewhere along its length as well. Additionally, or alternatively, the angled wall of the containment hook may also help retain projectiles and force the projectiles in a radially outward direction.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, and any other airborne and/or extraterrestrial (spacecraft) vehicle. Alternatively, or in addition, the gas turbine engine 100 may be utilized in a configuration unrelated to an aircraft such as, for example, an industrial application, a marine application (for example, for naval propulsion or hovercraft), or a weapon system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turbofan, or a turbojet engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, an engine casing 140, and an exhaust section 150. The engine casing 140 may be cylindrical in shape and extend axially along a center axis X over at least a portion of the gas turbine engine. The engine casing 140 may be disposed radially outward of at least the fan 112. The engine casing 140 may be comprised of any suitable ridged materials, for example, metal or a composite material, such as a carbon fiber composite material.

During operation of the gas turbine engine 100, fluid received from the intake section 120, such as air, travels through the gas turbine engine 100 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a shaft 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades of the turbine section 110 causing the shaft 114 to rotate. The fan blades 112 may rotate around an axis of rotation driven by shaft 114, which may correspond to the center axis X of the gas turbine engine in some examples.

Figure 2:
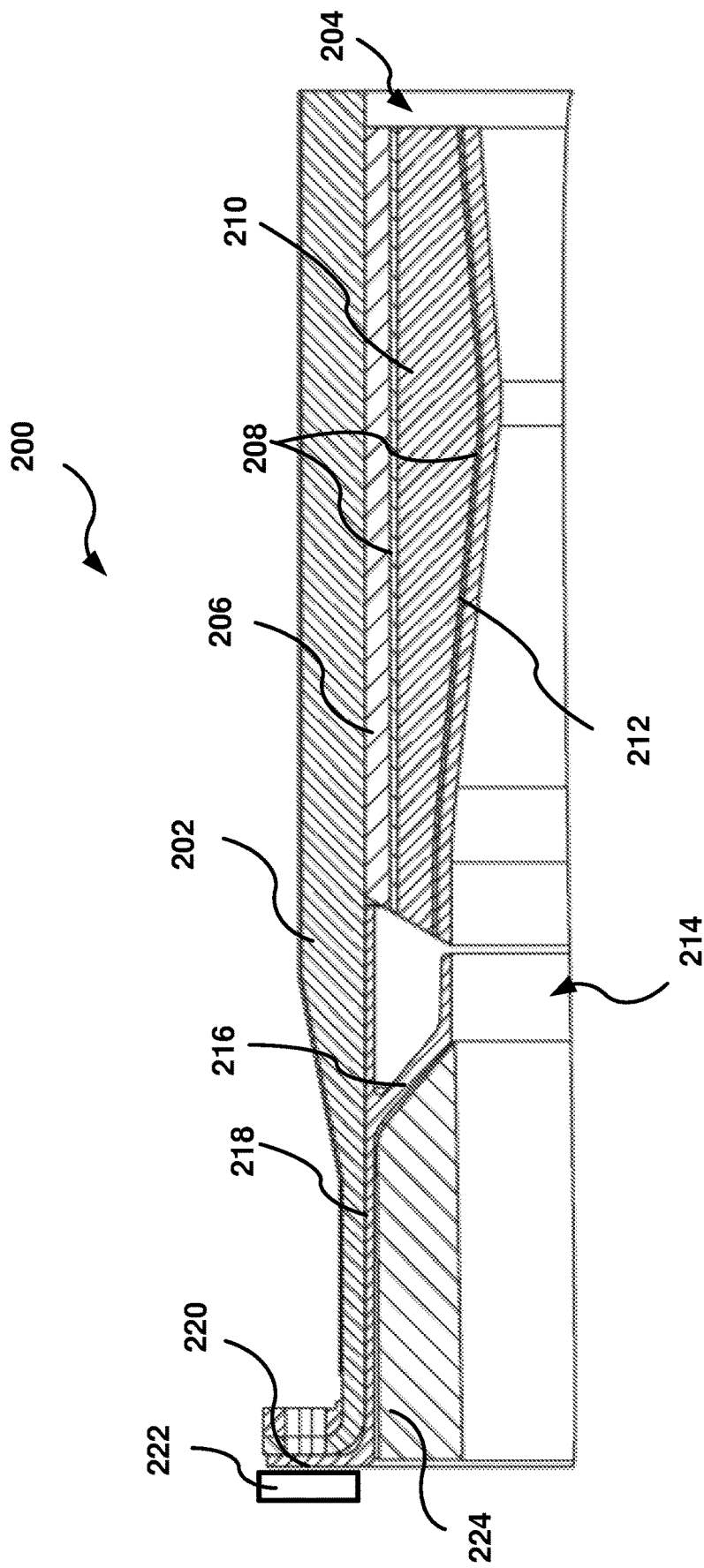
FIG. 2 illustrates an example fan case assembly.

FIG. 2 is a cross section of a fan case assembly 200. The fan case assembly 200 may be part of or attachable to the engine casing 140. The fan case assembly 200 may be disposed radially outwards of the fan blades 112. The fan case assembly 200 in the illustrated example comprises a barrel 202, a fan track liner 204, a containment hook 214, and a forward acoustic panel (FAP) 224. The fan track liner 204 may comprise a radially outer honeycomb layer 206, a radially inner honeycomb layer 210, separating layers 208, and an abradable liner 212. The containment hook 214 comprises a protruding segment 216, an axial segment 218, and a forward segment 220. The engine casing 140 (shown in FIG. 1) may be adjacent to and/or connected with a flange 222. The flange 222 may be, for example, a forward or aft flange of the inlet, or intake section 120, and/or the engine casing 140.

The fan case assembly 200 may be disposed on a radially inner surface of the engine casing 140 facing the fan blades 112. The barrel 202 may be radially outward for the fan track liner 204, the axial segment 216 and the protruding segment 216 of the containment hook 214, and the FAP 224. The barrel 202 may be axially aft of the flange 222 and extend, for example, from the flange 222 to another flange which is aft of end of the fan track liner 204.

The fan track liner 204 may be disposed on a radially inner surface of the barrel 202, facing the fan blades 112. The abradable liner 212 may be the radially inner most layer of the fan track liner 204. A separating layer 208 may be disposed at the radially outer surface of the abradable liner 212, between the abradable liner 212 and the radially inner honeycomb layer 210. Another separating layer 208 may be disposed at the radially outer surface of the radially inner honeycomb layer 210, between the radially inner honeycomb layer 210 and the radially outer honeycomb layer 206. The radially outer honeycomb layer 206 may be the radially outermost layer of the fan track liner 204, and may be disposed on adjacent to the radially inner most layer of the barrel 202.

The containment hook 214 may extend axially between the fan track liner 204 and the flange 222. The protruding segment 216 may extend radially inward from the axial segment 218 and extend between the FAP 224 and the fan track liner 204. The axial segment 218 of the containment hook 214 may extend axially parallel to the center axis X (the center axis shown, for example, in FIG. 1). The axial segment 218 of the containment hook 214 may be disposed radially inward of the barrel 202 and radially outward of the FAP 224. The forward segment 220 may extend radially outward from the axial segment 218 and extend parallel to the flange 222.

The barrel 202 may be a ring-shaped component included in the engine casing 140 and/or disposed on a radially inner surface of the engine casing 140. The barrel 202 may be cylindrical in shape, extend axially along the axis X. The barrel 202 may comprise a forward flange at one end of the barrel 202. The forward flange may extend parallel to the flange 222 and have a hole extending through the forward flange for fastening to the flange 222. The barrel 202 may be made of any suitable rigid material, for example but limited to, a composite material such as a carbon fiber composite or glass fiber or an aramid fiber or poly p-phenylene-2,6-benzobisoxazole (PBO).

The fan track liner 204, the radially outer honeycomb layer 206, the radially inner honeycomb layer 210, the abradable liner 212, and the separating layers 208 may be generally cylindrical in shape, disposed radially inward of the barrel 202, and extend axially along the axis X. The radially outer honeycomb layer 206 and the radially inner honeycomb layer 210 may comprise any hexagonal or Flex-Core shaped structure capable of absorbing energy, for example, an aluminum honeycomb structure. The radially outer honeycomb layer 206 may be denser and have a higher crush strength with smaller cell size than the radially inner honeycomb 210 layer. For example, the radially inner honeycomb layer may have a crush strength of approximately 4-6 pounds per cubic foot (PCF) and the radially outer honeycomb layer 206 may have a crush strength of 10-30 PCF greater than the radially inner honeycomb layer 210.

The separating layers 208 may be any material capable of separating and bonding the abradable liner 212 and the honeycomb layers 206, 210 to each other. The separating layers may comprise, for example, carbon fiber, glass fiber, and/or high modulus polypropylene fiber. The radially outer layer 208 may be thicker and/or stronger than the radially inner layer 208. The front edge of the fan track liner 204 may angle backwards in the aft direction as it extends radially outwards. For example, the abradable liner 212 may extend axially forward of the radially inner honeycomb layer 210, which may extend axially forward of the radially outer honeycomb layer 206.

The FAP 224 may disposed forward of the fan track liner 204 and the protruding segment 216, and radially inward of the axial segment 218. The FAP 224 may be cylindrical in shape and extend axially along the axis X. The FAP 224 may, for example, comprise aluminum hexagonal or Flex-Core honeycomb, glass fiber composite, and/or high modulus polypropylene composite.

The axial segment 218 of the containment hook 214 may be cylindrical in shape and extend axially along the center axis X between the flange 222 and the fan track liner 204. The forward segment 220 may extend parallel and adjacent to the flange 222 and may comprise one or more holes for fastening to the flange 222 with a fastener such as a bolt. The protruding segment 216 may extend (in other words, protrude) radially inward from the axial segment 218 and may extend radially inward at an angle such that, for example, the radially inward end of the protruding segment 216 is axially aft of the radially outer end of the protruding segment 216.

The protruding segment 216 may be, for example, shaped like an "L" where the radially inner end of the protruding segment 216 extends axially aft towards the fan track liner 204. The angle the protruding segment 216 extends radially inward at from the axial segment 218 and the "L" shape of the protruding segment 216 may form a cavity or gap between the containment hook 214 and the forward end of the fan track liner 204. The containment hook 214 may be, for example, comprised of metal such as aluminum, titanium, steel, nickel, a superalloy, and/or some other suitable material.

The flange 222 may be part of the engine casing 140 such as an inlet or nacelle structure. The flange may be, for example, the A1 flange of the engine casing 140 and may circumferentially surround the turbine engine 100 near the fan 112. The flange 222, containment hook 214, and/or barrel 202 may all comprise one or more holes configured to receive, for example, a bolt or other fastener to fasten the barrel 202, containment hook 214, and flange 222 together and the engine casing 140.

The flange 222 and/or forward segment 220 may be scalloped for both weight reduction as well as load transfer reduction. The skeletoning or pre-kinking of the axial segment 218 as well as scalloping of the flange 222 and/or forward segment 220 may allow for sufficient fixity of containment hook 214 with reduced weight and load transfer to the inlet compared to solid designs.

During operation of the engine 100, in the event of a fan blade off event where a fan blade or other debris from the engine becomes loose and forms a projectile (not shown), the projectile will be thrown radially outward towards the fan case assembly 200. The abradable layer 212, and honeycomb layers 210, 206, and separating layers 208 will absorb the kinetic energy of the projectile and crush and collapse upon impact. The collapsing honeycomb layers 210, 206 will absorb energy and allow the projectile to continue moving, albeit at a reduced velocity, radially outward toward the barrel 202. The shape and density of the honeycomb layers 210, 206 guide the projectile forward towards the protruding segment 216 of the containment hook 214. The projectile will move towards the cavity formed by containment hook 214 and forward end of the fan track liner 204 and become trapped in the cavity, which will prevent the projectile from re-entering the core of the engine 100 and causing damage to the engine 100. The angled leading edge of the fan track liner 204 allows the forward portion to crush and have the blade fragment/projectile be radially outward of the inner most extent of the protruding segment 216. At the same time, the outer portion of the containment hook 214 (for example, the axial segment 218) is axially aftward of the aft end of the inner portion of the protruding member 216, providing some radial protection for the barrel 202 forward of fan track liner 204.

Figure 3:
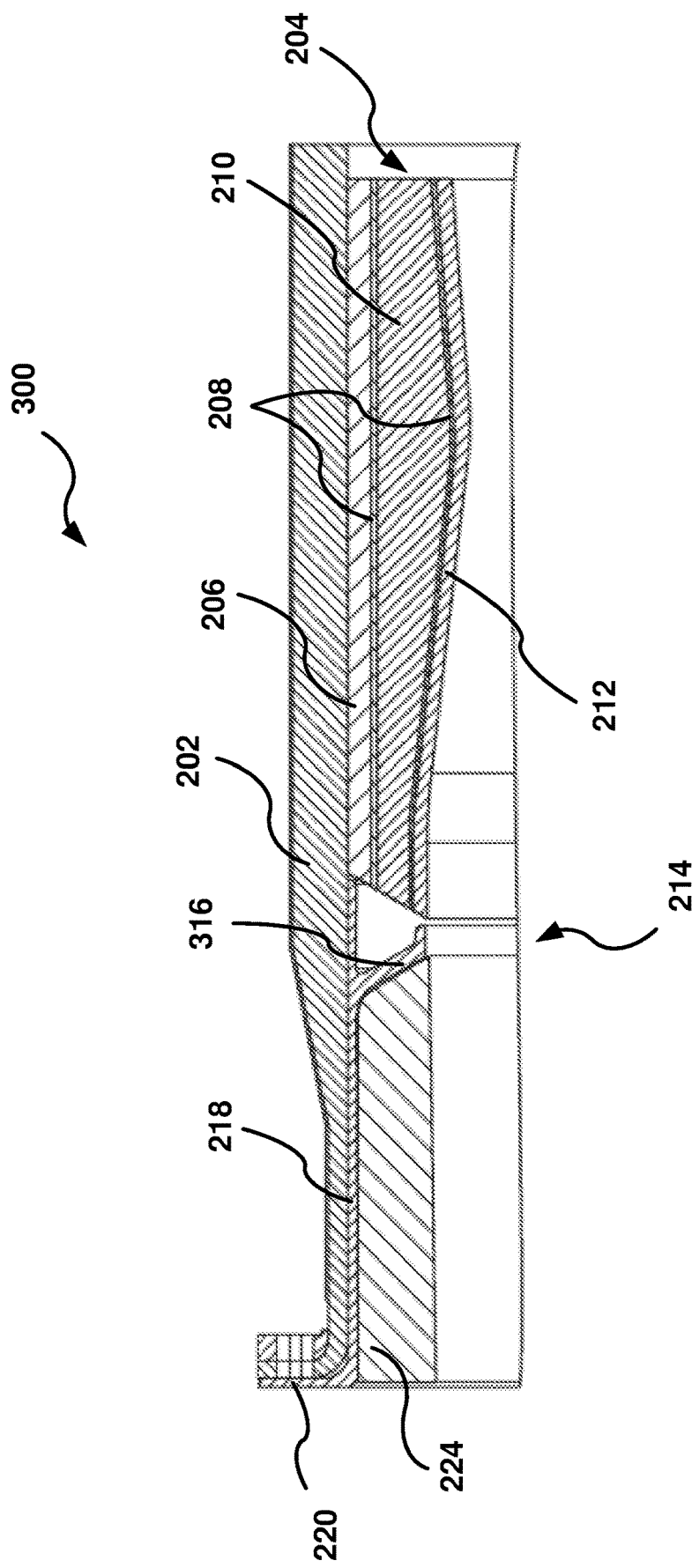
FIG. 3 illustrates an example fan case assembly.

FIG. 3 shows a cross section of the fan case assembly 300 where the fan case assembly comprises a containment hook 214 with a shortened protruding segment 316. For example, the "L" shaped end of the shortened protruding segment 316 may extend axially aft less than the protruding segment 216 shown in FIG. 2. Due to the shortened protruding segment 316, the fan track liner 204 may extend further forward so the gap between the containment hook 214 and the fan track liner 204 remains the same as with a longer protruding segment such as the protruding segment 216 shown in FIG. 2.

Figure 4:
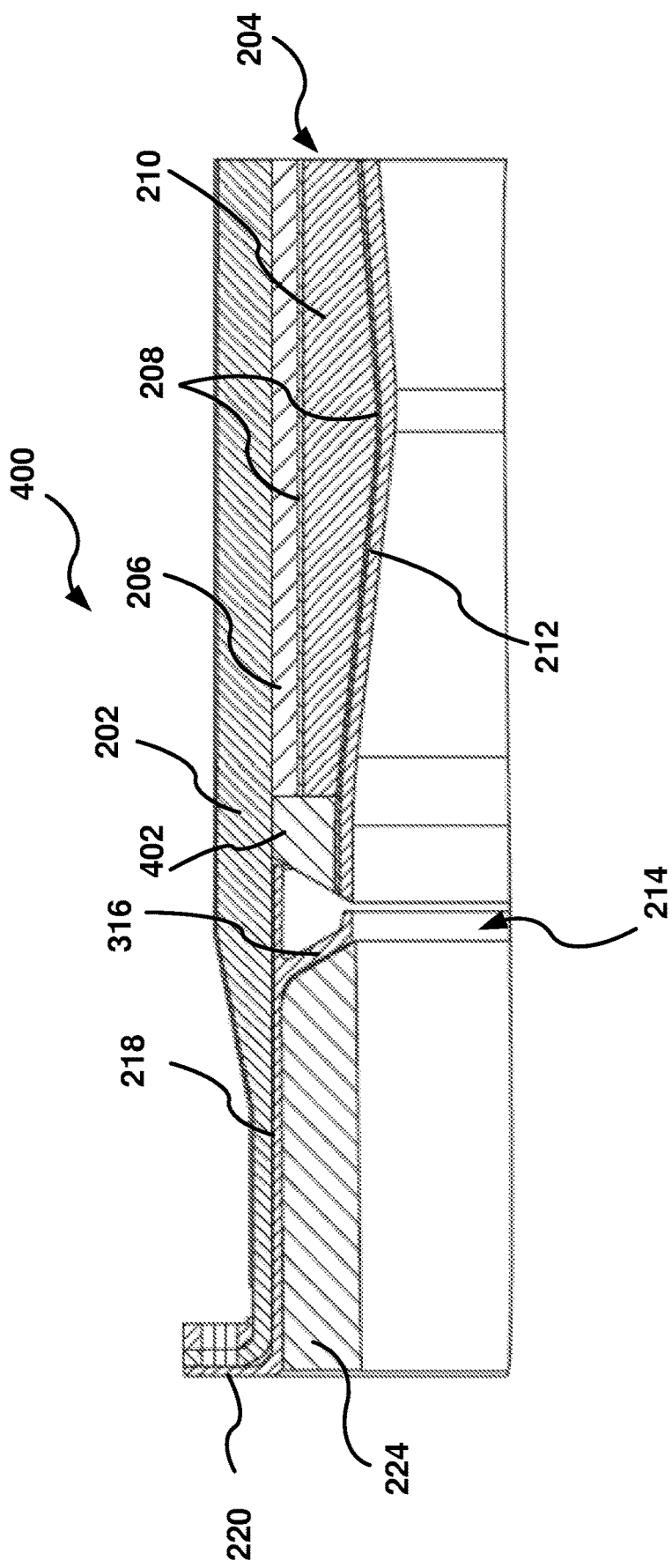
FIG. 4 illustrates an example fan case assembly.

FIG. 4 shows a cross section of the fan case assembly 400 where the fan track liner 204 comprises a forward honeycomb portion 402. The forward honeycomb portion 402 may be disposed axially forward of the radially inner and outer honeycomb layers 210, 206, and aft of the protruding segment 216, 316. The forward honeycomb portion 402 may have a lower density and crush strength than either the radially outer honeycomb layer 206 and/or the radially inner honeycomb layer 210. For example, the forward honeycomb portion 402 may have a crush strength of 3-5 PCF, and may, for example be comprised of a metallic hexagonal structure, such as an aluminum honeycomb, or aramid fiber with phenolic resin (Nomex honeycomb).

The forward edge of the forward honeycomb portion 402 may slope aft as the forward honeycomb portion 402 extends radially outward towards the barrel 202. For example, the forward honeycomb portion 402 may decrease in cross section width as the forward honeycomb portion 402 extends radially outward, such that a radially inner surface of the forward honeycomb portion 402 extends axially forward of a radially outer surface of the forward honeycomb portion 402. The relatively lower crush strength of the forward honeycomb portion 402 may help guide any projectile forward towards the cavity and containment hook 214 once the projectile hits the fan track liner 204. This may be feasible as the strength requirements decrease with more forward position of the liners relative to the fan blade 112.

Figure 5:
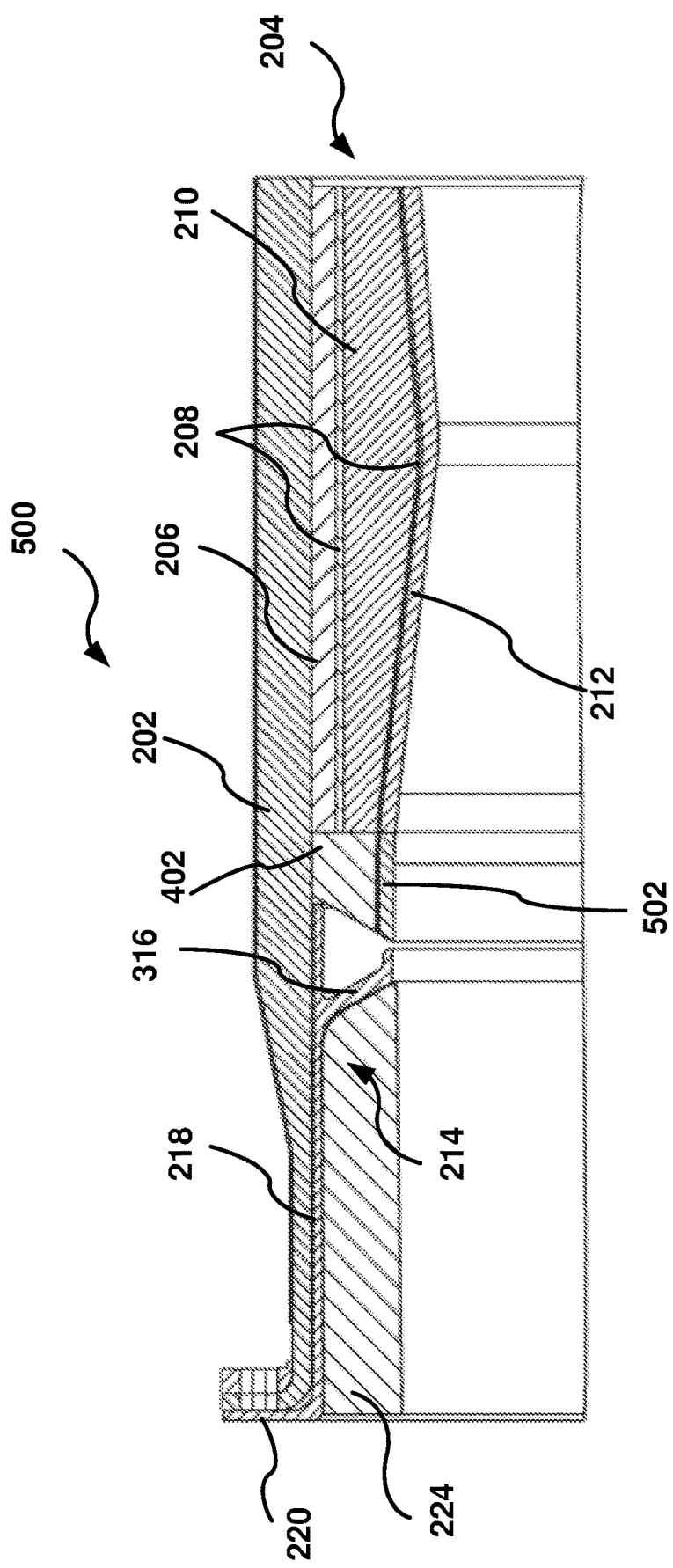
FIG. 5 illustrates an example fan case assembly.

FIG. 5 shows a cross section of the fan case assembly 500 where the fan track liner 204 comprises a forward abradable liner 502. The forward abradable liner 502 may be disposed axially forward of the abradable liner 212 and may be disposed radially inward of the forward honeycomb portion 402. The forward abradable liner 212 may have relatively lower density and crush strength than the abradable liner 212. For example, the forward abradable liner 502 may have a density of approximately ⅓ grams per cubic centimeter, whereas the abradable line 212 may have a density of ½ grams per cubic centimeter. The lower density of the forward abradable liner 502 may help guide projectiles towards the containment hook 214 and out of the core path of the engine 100.

Figure 6:
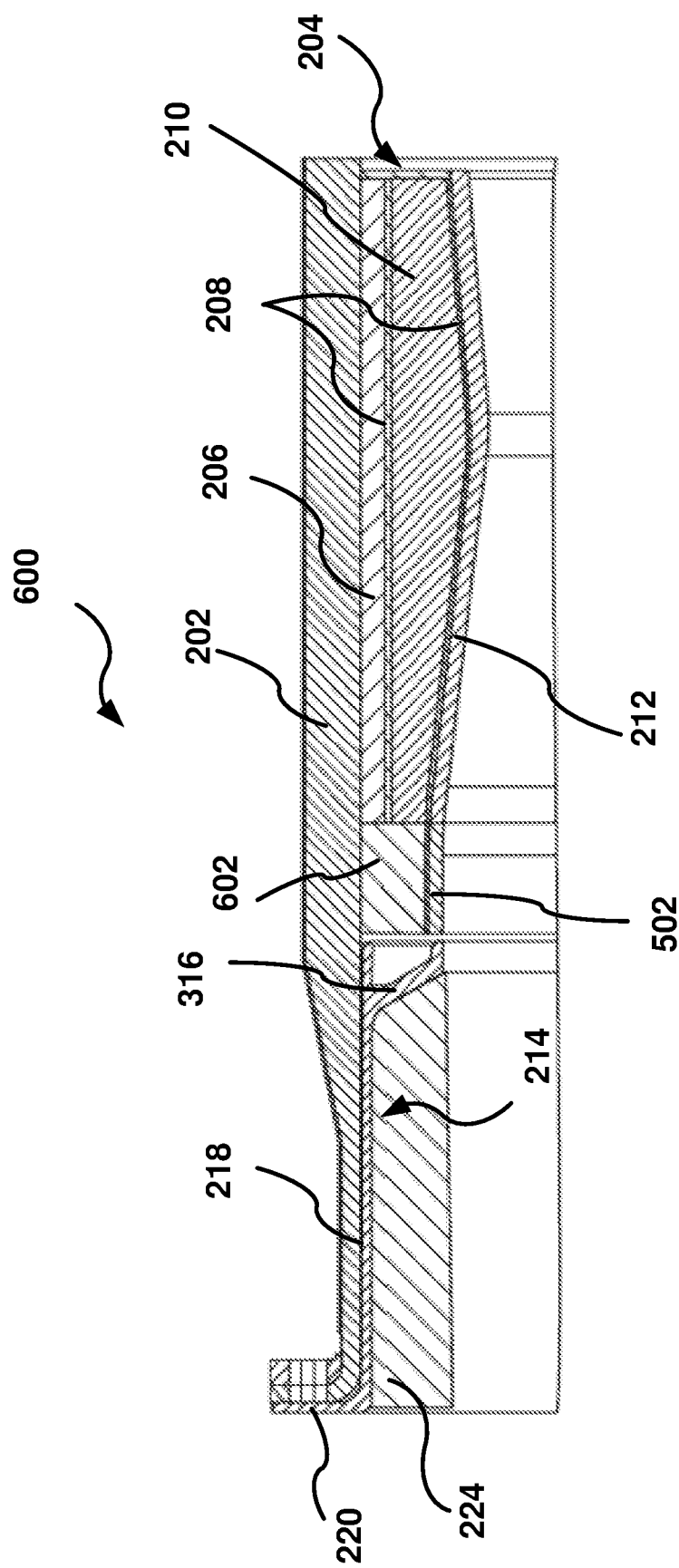
FIG. 6 illustrates an example fan case assembly.

FIG. 6 shows a cross section of the fan case assembly 600 where the fan track liner 204 comprises a forward honeycomb portion 602 with a square or rectangular-shaped cross section. The forward honeycomb portion 602 may be the same material and construction as the forward honeycomb portion 402 in FIGS. 4-5, but may have forward and aft surfaces that are substantially perpendicular to the abradable liner 502, 212 as opposed to sloping aft as the forward honeycomb portion 602 extends radially outward towards the barrel 202. For example, a cross sectional width of the forward honeycomb portion 602 may be constant as the forward honeycomb portion 602 extends radially outward from the abradable liner 502, 212 to the barrel 202. This may enable relatively easier manufacturing, construction, and assembly of the forward honeycomb portion 602 and fan track liner 214, as the square shape and edges may be easier to cut and bond to other components. However, the benefits of the reduced density and strength of the forward honeycomb portion 402 remain.

Figure 7:
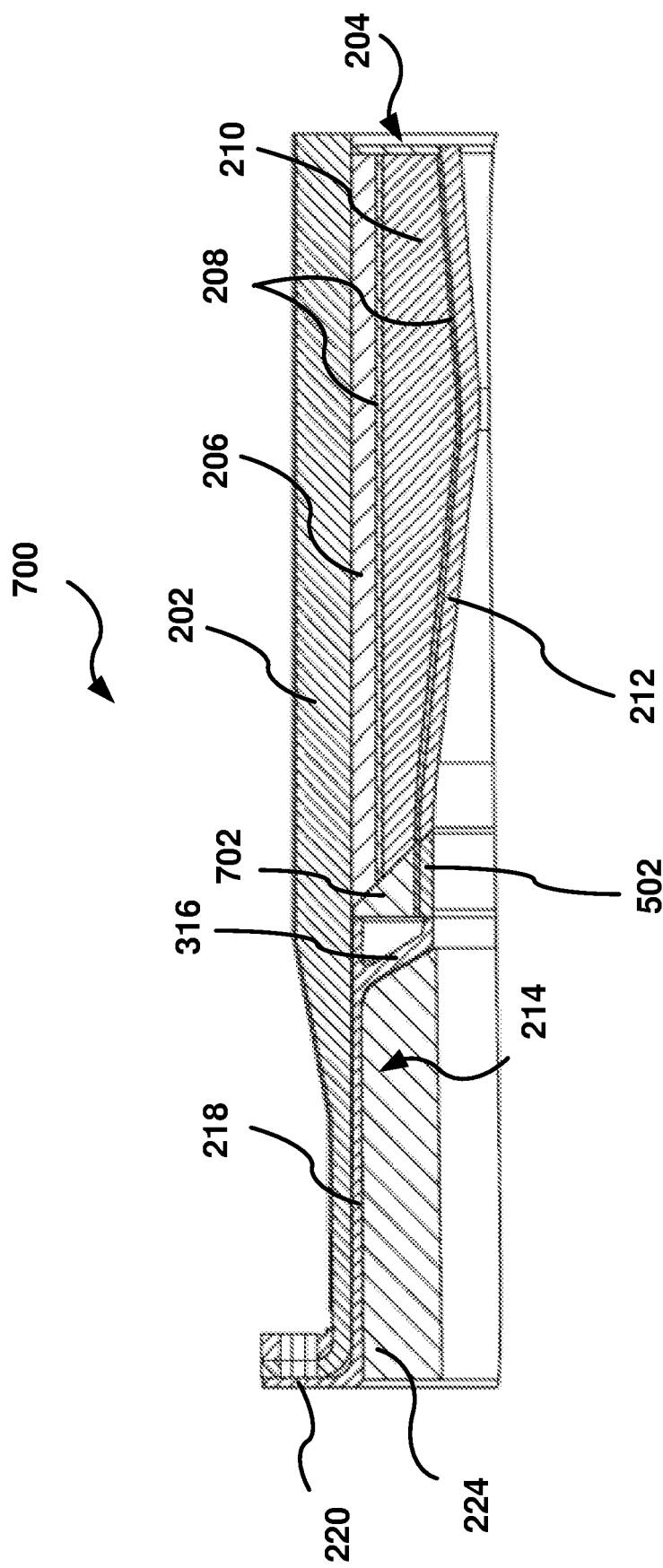
FIG. 7 illustrates an example fan case assembly.

FIG. 7 shows a cross section of the fan case assembly 700 where the fan track liner 204 comprises a forward honeycomb portion 702 with a triangular cross section. The forward honeycomb portion 702 may be the same material and construction as the forward honeycomb portion 402, 602 in FIGS. 4-6, but may have a forward surface that is substantially perpendicular to the radially inner surface of the fan track liner 502, 212 and an aft surface that slopes axially aft as the forward honeycomb portion 702 extends radially inward from the barrel 202 to the abradable liner 502, 212. The aft edge of the forward honeycomb portion 702 may, for example, slope forward as the forward honeycomb portion 702 extends radially outward towards the barrel 202. For example, the forward honeycomb portion 702 may decrease in cross section width as the forward honeycomb portion 702 extends radially outward, such that a radially inner surface of the forward honeycomb portion 702 extends axially aft of a radially outer surface of the forward honeycomb portion 702. This shape may help guide and ramp projectiles forward towards the cavity and protruding segment 216, 316 of the containment hook 214.

Figure 8:
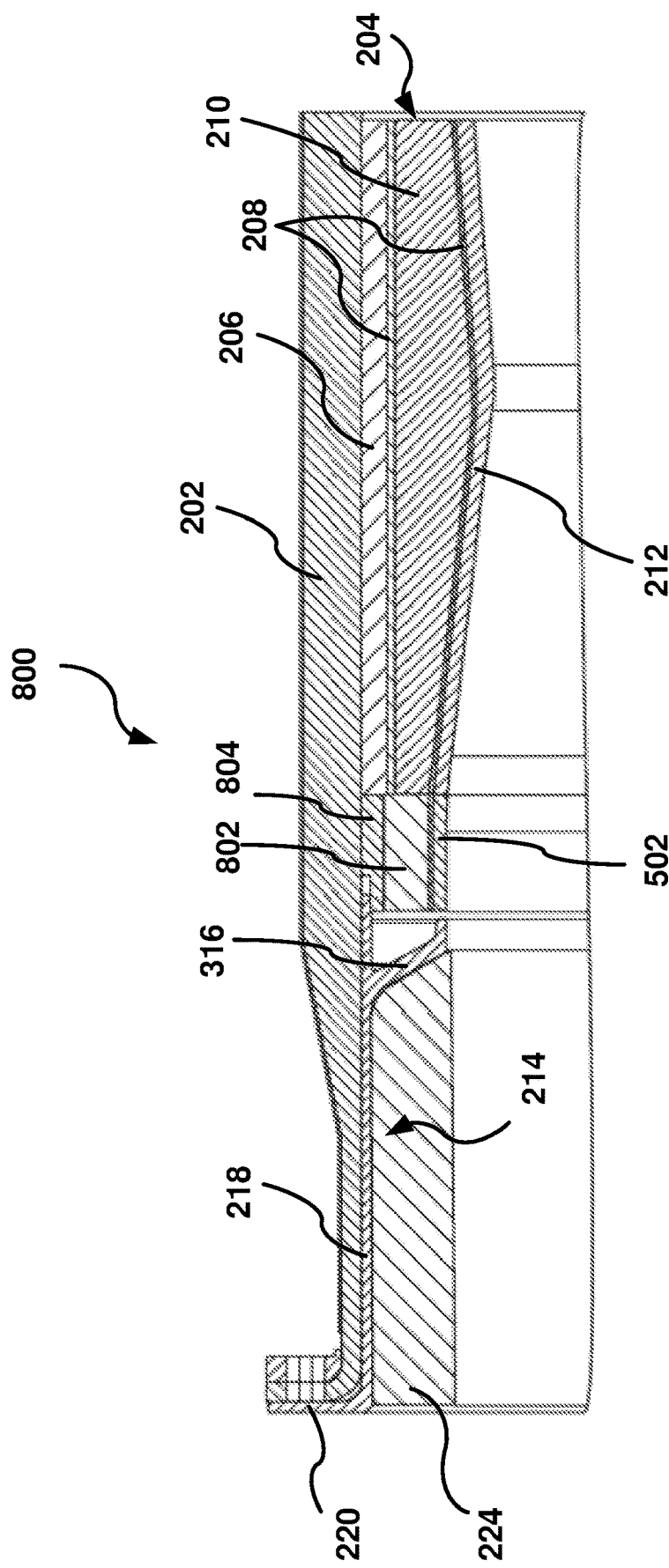
FIG. 8 illustrates an example fan case assembly.

FIG. 8 shows a cross section of the fan case assembly 500 where the fan track liner 204 comprised a radially shortened forward honeycomb portion 802 and a shielding piece 804. Shielding piece 804 may be metallic or composite such as carbon fiber, glass fiber, aramid fiber (Kevlar) or poly p-phenylene-2,6-benzobisoxazole fiber (PBO). The forward honeycomb portion 802 may be the same material, construction, and shape as any of the forward honeycomb portions 402, 502, 702 in FIGS. 4-7, but may not extend radially outward all the way to the barrel 202. The shielding piece 804 may be disposed radially outward of the forward honeycomb portion 802, between the forward honeycomb portion 802 and the barrel 202. The shielding piece 804 may be axially aft the aft edge of the axial segment 218 of the containment hook 214, and may be axially forward of the radially outer honeycomb layer 206. Additionally, or alternatively, the shielding piece 804 may have a step or cutout at the forward edge such that the radially inner surface of the shielding piece 804 extends axially forward of the radially outer surface of the shielding piece 804. This may enable the shielding piece 804 to at least partially overlap the aft end of the axial segment 218 at the radially inner surface of the axial segment 218. The shielding piece 804 may provide radial protection of the barrel 202 from projectiles and may help guide projectiles that pass through the forward honeycomb portion 802 forward towards the containment hook 214. For this purpose, the inner surface of shielding piece 804 may be sloping as to have the forward portion more radially outboard of the aft extent.

FIGS. 9A-C show the containment hook 214, where axial segment 218 of the containment hook 214 the containment hook comprises frame segments and/or a frame structure. FIG. 9A shows a view of the radially inner surface of the containment hook 214. FIGS. 9B-C show a cross section of the containment hook 214. Frame segments 900 may extend axially between the forward segment 220 and the protruding segment 216, 316 and form at least a portion of the axial segment 218. The frame segments 900 may extend perpendicular and/or at an angle to other frame segments and/or to the forward or aft surface of the axial segment 218, forming a lattice or frame structure. The frame segments 900 may be square, rectangular, or circular in cross section. Open portions 902 may be formed between the frame segments 900.

The containment hook 214 may contain any number or pattern of frame segments 900 and openings 902. For example, FIG. 9B shows a more open frame structure and pattern with relatively fewer frame segments 900 and openings 902 than the frame structure shown in FIG. 9C, which has a more closed structure and a higher mass and number of frame segments 900 and openings 902. The pattern and frame structure of the containment hook 214 may help with weight reduction of the containment hook. This may, for example, be designed with topology analysis to provide sufficient strength during static operation while buckling in a prescribed manner during a fan blade out to allow crushing to both absorb energy while allowing the hook to reduce in radial portion to serve as a better fence against forward debris. This may be enhanced with inclusion of small kinks or a corrugated design around mid-length of the axial portion. The pattern, kinks, and/or corrugated design of the axial segment 218 and/or other portions of the containment hook 214 may allow for additional dissipation of energy in the event of a projectile impacting the fan case assembly. Additionally or alternatively, the containment hook 214 may comprise intentional wrinkling to improve intentional buckling.

Each component may include additional, different, or fewer components. For example, the fan track liner 210 may include additional or fewer layers and/or sections of liners, honeycomb layers, and separating layers. The containment hook 214 may include additional segments or geometry. The engine casing 140 and fan case assembly 200, 300, 400, 500, 600, 700, 800 may include additional components.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a fan case assembly comprising: a center axis, the fan case assembly extending along and around the center axis; a barrel extending along and around the center axis, the barrel configured to fasten to a flange of an engine casing; a fan track liner disposed radially inward of the barrel, a forward edge of the fan track liner disposed aft of the flange; and a containment hook, wherein the containment hook is a discrete component separate from the barrel, the containment hook including a front segment configured to fasten to the flange, an axial segment disposed radially inward of the barrel, wherein the axial segment extends between the flange and the fan track liner, wherein the front segment extends radially outward from an end of the axial segment, and a protruding segment extending radially inward from the axial segment.

A second aspect relates to the fan case assembly of aspect 1 wherein the barrel comprises a composite material.

A third aspect relates to the fan case assembly of any preceding aspect wherein the protruding segment of the containment hook extends radially inward at an acute angle with a radially inner surface of the barrel facing the fan track liner.

A fourth aspect relates to the fan case assembly of any preceding aspect further comprising a forward acoustic panel disposed radially inward of the axial segment of the containment hook, wherein the protruding segment of the containment hook is disposed axially between the forward acoustic panel and the fan track liner.

A fifth aspect relates to the fan case assembly of any preceding aspect wherein at least a portion of the axial segment of the containment hook is a frame structure comprising openings.

A sixth aspect relates to the fan case assembly of any preceding aspect wherein the fan track liner comprises a first honeycomb section and a second honeycomb section, wherein the first honeycomb section is disposed axially between the protruding segment of the containment hook and the second honeycomb section.

A seventh aspect relates to the fan case assembly of any preceding aspect wherein the first honeycomb section is lower in density than the second honeycomb section.

An eighth aspect relates to the fan case assembly of any preceding aspect further comprising a first abradable layer section disposed radially inward of the first honeycomb section and a second abradable layer section disposed radially inward of the second honeycomb section, wherein the first abradable layer section is lower in strength than the second abradable layer section.

A ninth aspect relates to the fan case assembly of any preceding aspect wherein the first honeycomb section increases in width as the first honeycomb section extends radially inward from the barrel.

A tenth aspect relates to the fan case assembly of any preceding aspect wherein the first honeycomb section decreases in width as the first honeycomb section extends radially inward from the barrel.

An eleventh aspect relates to the fan case assembly of any preceding aspect wherein the first honeycomb section is a constant width as the first honeycomb section extends radially inward from the barrel.

A twelfth aspect relates to the fan case assembly of any preceding aspect wherein a shielding piece is disposed between the first honeycomb section and the barrel.

A thirteenth aspect relates to the fan case assembly of any preceding aspect wherein there is a gap between the containment hook and the shielding piece.

A fourteenth aspect relates to the fan case assembly of any preceding aspect wherein the fan track liner comprises a radially inner honeycomb layer and a radially outer honeycomb layer.

A fifteenth aspect relates to the fan case assembly of any preceding aspect wherein the radially inner honeycomb layer is lower in density than the radially outer honeycomb layer.

A sixteenth aspect relates to the fan case assembly of any preceding aspect wherein the fan track liner comprises a forward honeycomb portion disposed between the containment hook and the radially inner honeycomb layer.

A seventeenth aspect relates to the fan case assembly of any preceding aspect wherein the forward honeycomb portion is lower in density than the radially inner honeycomb layer.

An eighteenth aspect relates to the fan case assembly of any preceding aspect wherein the fan track liner comprises an abradable layer.

A nineteenth aspect relates to the fan case assembly of any preceding aspect wherein the fan track liner comprises a honeycomb structure.

A twentieth aspect relates to a fan case assembly comprising: a center axis, the fan case assembly extending along and around the center axis; a barrel extending along and around the center axis, the barrel comprising a composite material and configured to fasten to a flange of an engine casing; a fan track liner disposed radially inward of the barrel, a forward edge of the fan track liner disposed aft of the flange; a forward acoustic panel; and a containment hook, wherein the containment hook is a discrete component separate from the barrel, the containment hook including a front segment configured to fasten to the flange, an axial segment disposed radially inward of the barrel, wherein the axial segment extends axially between the flange and the fan track liner, wherein the front segment extends radially outward from a front end of the axial segment, and a protruding segment extending radially inward from the axial segment and toward the fan track liner, wherein the forward acoustic panel is disposed radially inward of the axial segment of the containment hook, and the protruding segment of the containment hook is disposed axially between the forward acoustic panel and the fan track liner.

In addition to the features mentioned in each of the independent aspects enumerated above, some examples may show, alone or in combination, the optional features mentioned in the dependent aspects and/or as disclosed in the description above and shown in the figures.

What is claimed is:

1. A fan case assembly comprising:
   a center axis, the fan case assembly extending along and around the center axis;
   a barrel extending along and around the center axis, the barrel configured to fasten to a flange of an engine casing;
   a fan track liner disposed radially inward of the barrel, a forward edge of the fan track liner disposed aft of the flange; and
   a containment hook, wherein the containment hook is a discrete component separate from the barrel, the containment hook including
   a front segment configured to fasten to the flange,
   an axial segment disposed radially inward of the barrel, wherein the axial segment extends along the barrel from the flange to the fan track liner, wherein the front segment extends radially outward from an end of the axial segment, and
   a protruding segment extending axially and radially inward from the axial segment to the fan track liner,
   wherein the forward edge of the fan track liner is located aft of a terminal end of the protruding segment and the forward edge is configured to deform radially outwardly toward the barrel to form an opening between the forward edge of the fan track liner and the terminal end of the protruding segment in response to a projectile moving radially outwardly toward the barrel so that the projectile moves into the opening and is trapped within the opening,
   wherein a terminal end of the axial segment of the containment hook extends axially aft beyond the terminal end of the protruding segment of the containment hook.

2. The fan case assembly of claim 1 wherein the barrel comprises a composite material.

3. The fan case assembly of claim 1 wherein the protruding segment of the containment hook includes a first portion that extends radially inward and axially aft from the axial segment of the containment hook and a second portion that extends axially aft from the first portion toward the fan track liner, and wherein the terminal end of the protruding segment is formed on the second portion.

4. The fan case assembly of claim 1 further comprising a forward acoustic panel disposed radially inward of the axial segment of the containment hook, wherein the protruding segment of the containment hook is disposed axially between the forward acoustic panel and the fan track liner.

5. The fan case assembly of claim 1 wherein at least a portion of the axial segment of the containment hook is a frame structure comprising openings.

6. The fan case assembly of claim 1 wherein the fan track liner comprises a first honeycomb section and a second honeycomb section, wherein the first honeycomb section is disposed axially between the protruding segment of the containment hook and the second honeycomb section.

7. The fan case assembly of claim 6 wherein the first honeycomb section is lower in density than the second honeycomb section.

8. The fan case assembly of claim 7 further comprising a first abradable layer section disposed radially inward of the first honeycomb section and a second abradable layer section disposed radially inward of the second honeycomb section, wherein the first abradable layer section is lower in strength than the second abradable layer section.

9. The fan case assembly of claim 7 wherein the first honeycomb section increases in width as the first honeycomb section extends radially inward from the barrel.

10. The fan case assembly of claim 7 wherein the first honeycomb section is a constant width as the first honeycomb section extends radially inward from the barrel.

11. The fan case assembly of claim 7 wherein a shielding piece is disposed between the first honeycomb section and the barrel.

12. The fan case assembly of claim 11 wherein there is a gap between the containment hook and the shielding piece.

13. The fan case assembly of claim 1 wherein the fan track liner comprises a radially inner honeycomb layer and a radially outer honeycomb layer.

14. The fan case assembly of claim 13 wherein the radially inner honeycomb layer is lower in density than the radially outer honeycomb layer.

15. The fan case assembly of claim 13 wherein the fan track liner comprises a forward honeycomb portion disposed between the containment hook and the radially inner honeycomb layer.

16. The fan case assembly of claim 15 wherein the forward honeycomb portion is lower in density than the radially inner honeycomb layer.

17. The fan case assembly of claim 1 wherein the forward edge of the fan track liner extends axially forward and radially inwardly from the barrel to form an acute angle with the barrel such that a radial gap is formed between the forward edge of the fan track liner and the barrel thereby allowing the forward edge to deform radially outwardly.

18. A fan case assembly comprising:
a center axis, the fan case assembly extending along and around the center axis;
a barrel extending along and around the center axis, the barrel comprising a composite material and configured to fasten to a flange of an engine casing;
a fan track liner disposed radially inward of the barrel, a forward edge of the fan track liner disposed aft of the flange;
a forward acoustic panel; and
a containment hook, wherein the containment hook is a discrete component separate from the barrel, the containment hook including
a front segment configured to fasten to the flange,
an axial segment disposed radially inward of the barrel, wherein the axial segment extends along the barrel from the flange to the fan track liner, wherein the front segment extends radially outward from a front end of the axial segment, and
a protruding segment extending radially and axially inward from the axial segment to the fan track liner, wherein the forward acoustic panel is disposed radially inward of the axial segment of the containment hook, and the protruding segment of the containment hook is disposed axially between the forward acoustic panel and the fan track liner,
wherein the forward edge of the fan track liner is located aft of a terminal end of the protruding segment and the forward edge is configured to deform radially outwardly toward the barrel to form an opening between the forward edge of the fan track liner and the terminal end of the protruding segment in response to a projectile moving radially outwardly toward the barrel so that the projectile moves into the opening and is trapped within the opening,
wherein the forward edge of the fan track liner extends axially forward and radially inwardly from the barrel to form an acute angle with the barrel such that a radial gap is formed between the forward edge of the fan track liner and the barrel thereby allowing the forward edge to deform radially outwardly.

19. The fan case assembly of claim 18 wherein a terminal end of the axial segment of the containment hook extends axially aft beyond the terminal end of the protruding segment of the containment hook.

20. A fan case assembly comprising:
a center axis, the fan case assembly extending along and around the center axis;
a barrel extending along and around the center axis, the barrel configured to fasten to a flange of an engine casing;
a fan track liner disposed radially inward of the barrel, a forward edge of the fan track liner disposed aft of the flange; and
a containment hook, wherein the containment hook is a discrete component separate from the barrel, the containment hook including
a front segment configured to fasten to the flange,
an axial segment disposed radially inward of the barrel, wherein the axial segment extends along the barrel from the flange to the fan track liner to abut the fan track liner, wherein the front segment extends radially outward from an end of the axial segment, and
a protruding segment extending axially and radially inward from the axial segment to the fan track liner.

* * * * *